(12) United States Patent
Salsich et al.

(10) Patent No.: US 8,637,786 B2
(45) Date of Patent: Jan. 28, 2014

(54) METHOD AND APPARATUS FOR HIGH POWER DENSITY PLASMA CUTTING SYSTEM

(75) Inventors: Anthony V. Salsich, Appleton, WI (US); David P. Marcusen, Hortonville, WI (US); Nathan G. Leiteritz, Appleton, WI (US); Nick William Buettner, Burlington, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1254 days.

(21) Appl. No.: 12/239,951

(22) Filed: Sep. 29, 2008

(65) Prior Publication Data
US 2010/0078410 A1 Apr. 1, 2010

(51) Int. Cl.
*H05H 1/26* (2006.01)
*B23K 10/00* (2006.01)

(52) U.S. Cl.
USPC ............. 219/121.39; 219/121.54; 219/121.48

(58) Field of Classification Search
CPC ....................................................... H05H 1/26
USPC ............ 219/121.39, 121.44, 121.45, 121.54, 219/121.55, 121.57, 75
See application file for complete search history.

(56) References Cited

U.S. PATENT DOCUMENTS

| | | | |
|---|---|---|---|
| 6,359,251 B1 * | 3/2002 | Picard et al. ............. | 219/121.57 |
| 7,336,512 B2 | 2/2008 | Geissler | |
| 7,605,341 B2 * | 10/2009 | Higgins et al. ........... | 219/121.55 |
| 2008/0023451 A1 * | 1/2008 | Salsich et al. ............ | 219/121.48 |

* cited by examiner

*Primary Examiner* — Mark Paschall
(74) *Attorney, Agent, or Firm* — Fletcher Yoder, P.C.

(57) ABSTRACT

A system and method for providing a high power density plasma cutting/welding-type system is disclosed. The plasma cutting system includes a housing and a power source disposed within the housing constructed to generate plasma cutting power. The plasma cutting system also includes a plasma torch actuated by a trigger and connected to the power source to produce a cutting arc. The plasma cutting system is constructed such that it has a power-to-weight ratio of at least 550 Watts per kilogram (W/kg).

24 Claims, 6 Drawing Sheets

METHOD AND APPARATUS FOR HIGH POWER DENSITY PLASMA CUTTING SYSTEM

BACKGROUND OF THE INVENTION

The present invention relates generally to plasma cutting/welding-type systems and, more particularly, to a method and apparatus for providing a high power density plasma cutting/welding-type system.

Plasma cutting is a process in which an electric arc and plasma gas are used to cut or gouge a workpiece. Plasma cutters typically include a power source, a gas supply, such as compressed air, and a torch. The torch is constructed to create and maintain the plasma arc. To generate the plasma cutting power, a power source receives an input voltage from a transmission power receptacle or generator and provides output power to a pair of output terminals. One of the output terminals is connected to an electrode and the other is connected to the workpiece. An air supply is used with most plasma cutters to carry and propel the arc to the workpiece and assist in cooling the torch.

The need and desire for plasma cutting systems to become portable has increased over the years. To achieve this portability, plasma cutting systems have been designed to have lighter unit weights and improved electrical components. One advancement in the area of electrical components has been the incorporation of inverter-type power sources. The application of an inverter power source has reduced the size and weight of plasma cutters and created usable space within the confines of the housing, while maintaining the ability to generate the outputs required for plasma cutting.

In existing plasma cutting systems, however, there have been limits to the reductions in size that are achievable. Existing plasma cutting systems typically include a gas supply system including a pressure regulator; a downstream pressure gauge; a downstream, solenoid operated gas valve; and a downstream pressure limit switch, so as to provide the plasma torch with a consistent, and preferably controllable, air flow. Using such a configuration, the operator is able to start and stop the gas flow as necessary, as well as access and adjust gas pressure settings to configure the plasma cutting system for a different cutting operation. However, while control of air pressure settings in this manner provides an operator with a great deal of control, such a construction also occupies a great deal of space within the plasma cutter and necessarily increases the overall size and weight of the plasma cutter.

It would, therefore, be desirable to design a plasma cutting system having a reduced size and weight that still provides for a precise and dynamic gas pressure regulation. It would further be desirable for such a reduced size/weight system to have the ability to produce a high power density, so as to generate the outputs required for plasma cutting.

BRIEF DESCRIPTION OF THE INVENTION

Embodiments of the invention provide a system and method of providing a high power density plasma cutting/welding-type system.

In accordance with one aspect of the present invention, a plasma cutting system includes a housing and a power source disposed within the housing constructed to generate plasma cutting power. The plasma cutting system also includes a plasma torch actuated by a trigger and connected to the power source to produce a cutting arc and has a power-to-weight ratio of at least 550 Watts per kilogram (W/kg).

In accordance with another aspect of the present invention, a plasma cutting system includes a housing and a power source disposed within the housing constructed to generate plasma cutting power, the power source comprising a four-pole power switch including a pair of two-pole connections to form a compact high power two-pole switch. The plasma cutting system also includes a plasma torch actuated by a trigger and connected to the power source, a gas flow system constructed to receive pressurized gas and provide a gas flow to the plasma torch, and a single-coil proportional valve connected to the gas flow system and having a control to regulate gas flow to the plasma torch.

In accordance with yet another aspect of the invention, a plasma cutting system includes a housing and a power source disposed within the housing constructed to generate plasma cutting power, with the power source comprising a power factor correction circuit configured to maintain a power factor of the power source below unity and reduce bus voltage ripple in the power source. The plasma cutting system also includes a plasma torch actuated by a trigger and connected to the power source and a gas flow system constructed to receive pressurized gas and provide a gas flow to the plasma torch.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Figure 1:
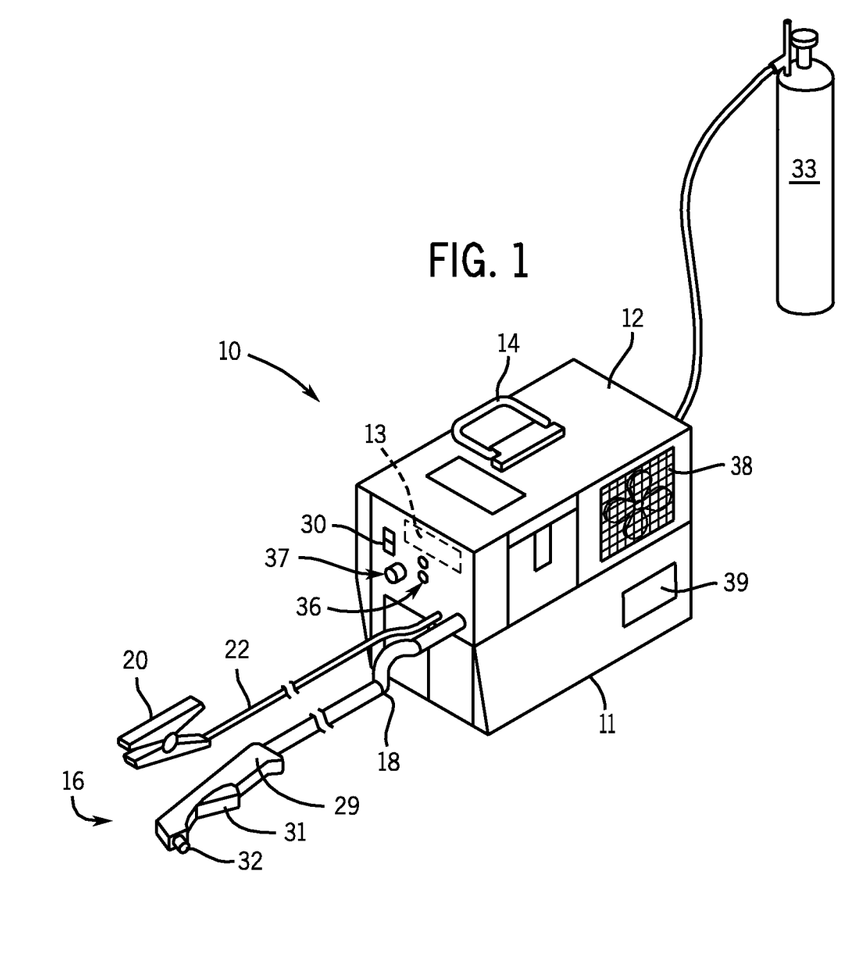
FIG. 1 is a perspective view of a plasma cutting system according to the present invention.

FIG. 1 shows a plasma cutting system 10 according to an embodiment of the present invention. Plasma cutting system 10 is a high voltage system with open circuit output voltages that typically range from approximately 230 Volts Direct Current (VDC) to over 300 VDC. Plasma cutting system 10 includes a housing 11 enclosing a power source 12 configured to condition raw power and generate a power signal suitable for plasma cutting applications. Power source 12 includes a controller 13 that receives operational feedback and monitors the operation of a plasma cutting system 10. Power source housing 11 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it is understood and within the scope of the claims that trigger 31 could be connected to power source 12 or otherwise remotely positioned relative to actuating torch 16.

Also connected to power source 12 is a work clamp 20, which is designed to connect to a workpiece (not shown) to be cut and provide a grounding or return path. Connecting work clamp 20 to power source 12 is a cable 22 designed to provide the return path, or grounding path, for the cutting current from torch 16 through the workpiece and work clamp 20. Power source 12 includes a plurality of inputs such as an ON/OFF switch 30 and may also include amperage controls and indicator lights 36. Power source 12 can include an operating mode selector 37 connected to controller 13, which allows an operator to select a desired mode of operation of the plasma cutting system 10. That is, an operator can manually configure the plasma cutting system 10 to operate in a cutting or gouging mode if the system is so equipped.

To effectuate cutting, torch 16 is placed in close proximity to the workpiece connected to clamp 20. A user then activates trigger 31 on torch 16 to deliver electrical power and compressed air to work tip 32 of torch 16 to initiate a pilot arc and plasma jet. Shortly thereafter, a cutting arc is generated as the user moves the torch to the workpiece. The arc transfers from the electrode to the workpiece through the tip. The user may then perform the desired plasma effectuated processing of the workpiece by moving torch 16 across the workpiece. The user may adjust the speed of the cut to reduce spark spatter and provide a more-penetrating cut by adjusting amperage and/or air pressure. Gas is supplied to torch 16 from a pressurized gas source 33, from an internal air compressor 39, or an air compressor (not shown) external to power source 12.

Also included in plasma cutting system 10 is a cooling fan 38 configured to provide cooling to power supply 12. Cooling fan 38 is designed to dissipate heat in the interior volume of power supply housing 11 by pulling cooler ambient air through the power supply housing to create a cooling effect during operation of plasma cutting system 10. Cooling fan 38 draws air across a plurality of fins of a heat sink (not shown) included within the power supply housing 11 to provide efficient cooling. According to an exemplary embodiment of the invention, cooling fan 38 operates as a high-speed fan, so as to meet the increased cooling requirements of power source 12 as it provides increased voltage (~230-300 VDC) for performance of a plasma cutting process and to overcome a pressure drop created by the heat sink. Thus, cooling fan 38 is configured to operate at approximately 8,000 RPM or higher (e.g., 10,000 RPM) to provide this increased cooling, as opposed to typical cooling fans in plasma cutting systems that operate at 4,500 to 5,000 RPM.

Figure 2:
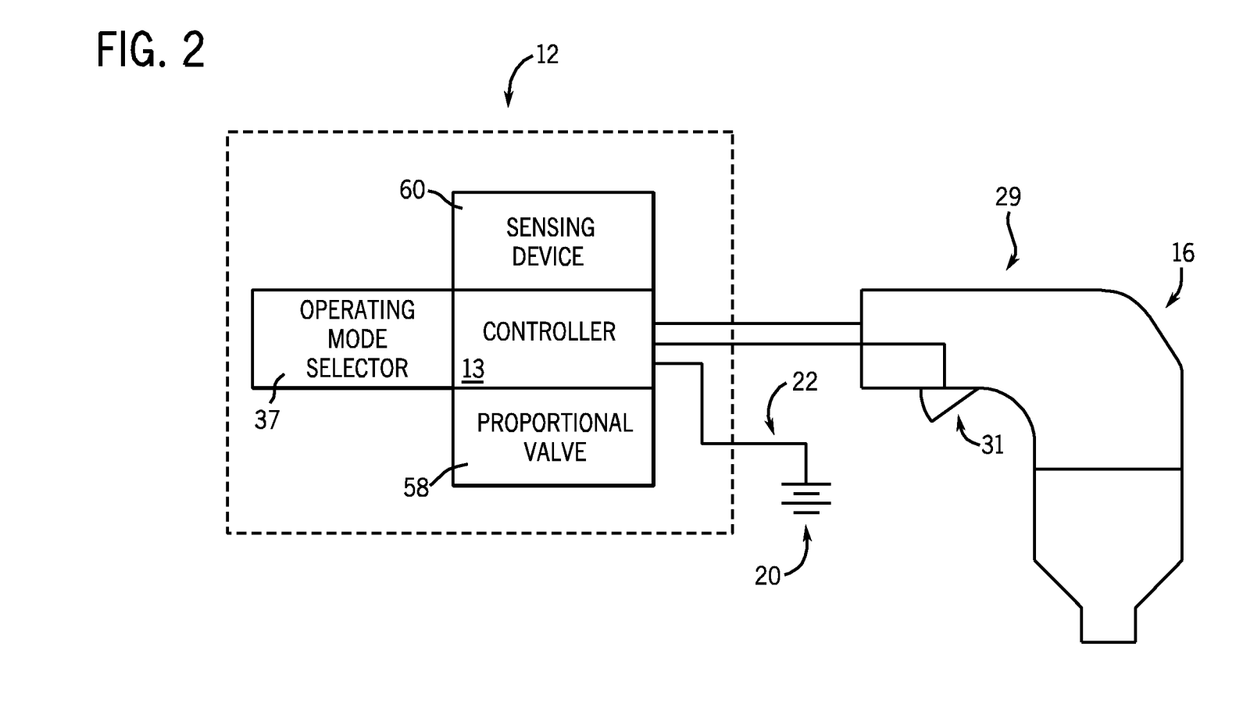
FIG. 2 is a schematic representation of the plasma cutting system shown in FIG. 1.

Referring now to FIG. 2, in one embodiment, controller 13 is disposed within power source housing 11. Controller 13 is connected to an operating mode selector 37. Operating mode selector 37 is used to select a desired mode of operation of the plasma cutting system 10. Each mode of operation corresponds to a specific set of gas pressure and gas flow set points. The set points will exemplify ideal operating conditions for the plasma cutting system 10 for each mode of operation. Controller 13 is configured to store information regarding the gas pressure and gas flow set points for each desired mode of operation.

Controller 13 is additionally operatively connected to plasma torch 16 and trigger 31, as well as to sensing device 60. Sensing device 60 is configured to communicate to controller 13 one of an outlet or inlet gas pressure and/or a gas flow. In one embodiment, the sensing device 60 is a pressure sensor used to measure output gas pressure. The pressure sensor can be a piezo-resistive pressure sensor or any other similar sensor capable of measuring gas pressure in a welding-type environment. A detected output gas pressure at proportional valve 58 is measured by pressure sensor 60 and communicated to controller 13. The detected output pressure provides controller 13 with the information necessary to calculate a drive signal to be sent to proportional valve 58, wherein the drive signal can be either of a current or a voltage. The drive signal sent to proportional valve 58 by the controller 13 thus regulates the gas pressure used in the cutting operation for the plasma cutting system 10.

Controller 13 is further configured to determine an input gas pressure in the plasma cutting system 10 as a function of output pressure and the drive signal. In one embodiment, a look-up table is used to set forth an input pressure and an output pressure associated with each of a number of cutting operations selected by way of the operating mode selector 37. Inconsistencies in the input gas pressure can then be detected by comparing an expected drive signal current or voltage to be sent to the proportional valve 58, which is given in the look-up table for a corresponding given input and output gas pressure, to a drive signal that is actually necessary to achieve the desired output gas pressure in the plasma cutting system for the selected cutting operation. Once the trigger 31 of the plasma torch 16 is actuated, the expected drive signal and the actual necessary drive signal can be compared to determine if the actual input pressure in the plasma cutting system differs from the input pressure given in the look-up table. Controller 13 is also configured to notify the operator that there is an out-of-spec input pressure via an indicator light 36 (shown in FIG. 1) located on face of the power supply housing 11 or through some other acceptable means.

In addition, controller 13 is also configured to make gas pressure adjustments when the plasma cutting system 10 is set-up as having the sensing device 60 located within the power source housing 11. Controller 13 calculates a necessary gas pressure correction for a given length of torch cable 24 (shown in FIG. 1) by measuring a gas pressure fall time after the proportional valve 58 is completely closed.

Figure 3:
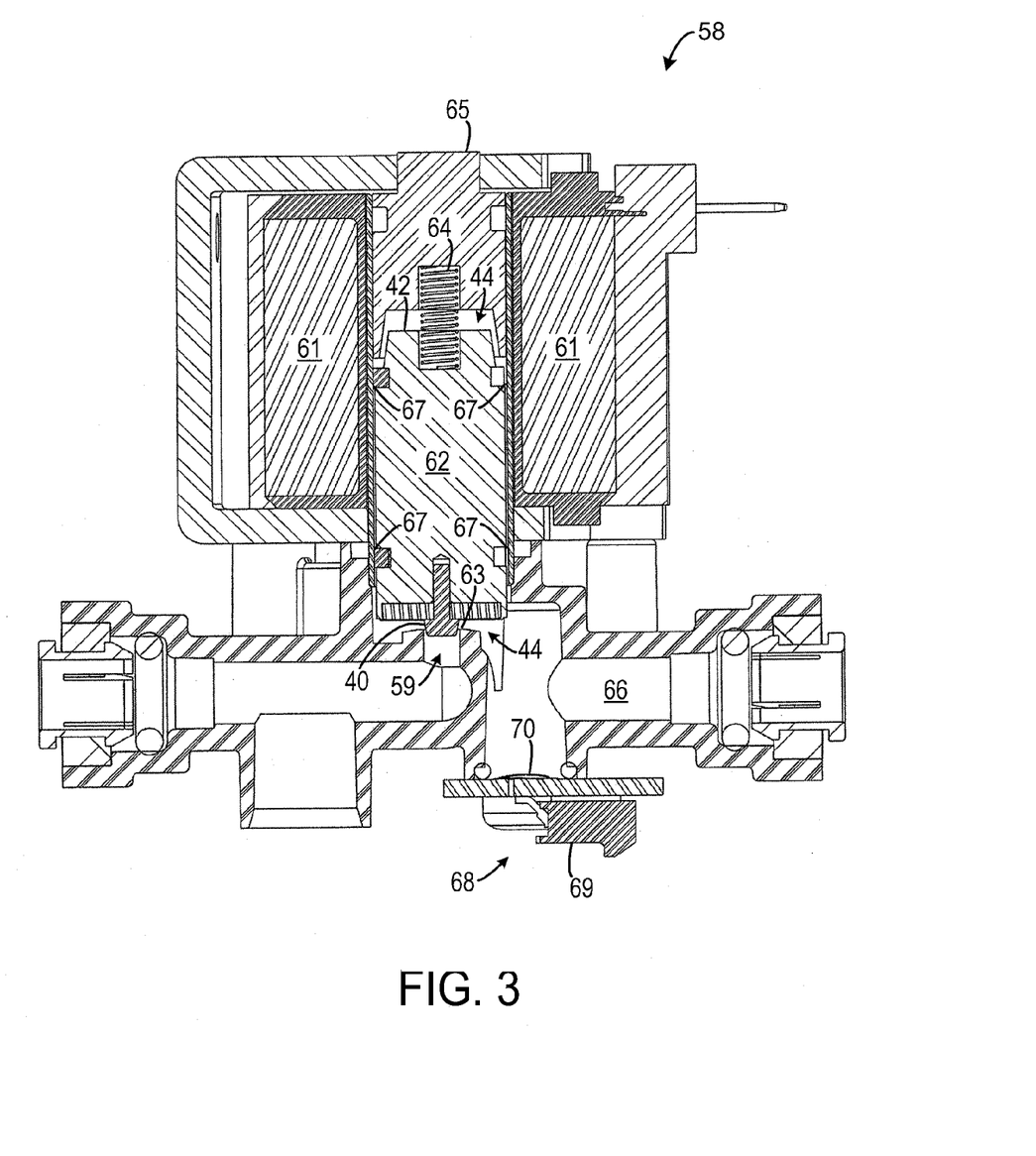
FIG. 3 is a cross sectional view of the proportional valve in the plasma cutting system of FIG. 1.

Referring now to FIG. 3, proportional valve 58 is shown in greater detail. The proportional valve 58 has an adjustable orifice 59 whose effective size is determined by the amount of electric current or voltage in the drive signal and running through a coil 61 (i.e., electrical solenoid) in the proportional valve. Coil 61 is configured to generate an electro-magnetic force in response to the amount of current or voltage in a drive signal transmitted thereto by controller 13 in response to gas pressure fluctuations during a plasma cutting process, which correspondingly increases or decreases the effective size of the orifice 59, thereby incrementally regulating the gas pressure in the plasma cutting system 10. More specifically, the varying of a voltage or current in the drive signal sent to coil 61 and the resulting varying magnetic force generated thereby, together with biasing forces tending to close the proportional valve 58, control the movement of a plunger 62, or a similar translatable device (e.g., valve needle, valve ball), relative to the orifice to vary the effective size of the orifice 59. Plunger 62 is mounted within proportional valve 58 and is movably secured therein to a valve body 65. Plunger 62 includes a mating surface 40 on one end thereof and a pressure receiving surface 42 on an opposite end thereof. The mating surface 40 is configured to rest within a valve seat 63 surrounding orifice 59 and mate with the orifice 59. Plunger 62 is at least partially surrounded by coil 61 (i.e., positioned within a chamber of the electrical solenoid). When a current or voltage (i.e., drive signal) is sent through the coil 61, plunger 62 is caused to translate relative to orifice 59 and separate (i.e., move away) therefrom in response to the magnetic force, thus allowing an outlet/output air flow through orifice 59. When there is no current or voltage being sent through coil 61, mating surface 40 of plunger 62 mates with orifice 59 in valve seat 63, thus cutting off the outlet gas flow through the orifice 59.

According to an exemplary embodiment of the invention, proportional valve 58 is constructed as a single-coil, pressure closing type proportional valve (i.e., an air pressure-closing type valve). As shown in FIG. 3, a gas flow from gas source 33 (FIG. 1) is supplied through an inlet chamber 66 into proportional valve 58. While a single inlet chamber 66 is shown in FIG. 3, it is also recognized that an additional inlet chamber could be formed such that, for example, pressurized gas could enter proportional valve 58 at a separate location above plunger 62. The gas flow taken in through inlet chamber 66 and into proportional valve 58 flows into a downstream valve chamber 44 via a fluid connection therebetween, the valve chamber 44 generally surrounding plunger 62 and having orifice 59 formed on one end thereof. The gas flow has a closing pressure or force that is sufficient to bias plunger 62 towards orifice 59 and acts to cut off gas flow through the orifice 59. That is, upon the initiation of a gas flow through inlet chamber 66 into proportional valve 58, and the transfer of the pressurized gas flow into valve chamber 44, plunger 62 is positioned in a default location such that it mates with orifice 59 via valve seat 63 to close the orifice and cut off the outlet gas flow therethrough. When plunger 62 is in the "closed" position, a bias or biasing mechanism 64 (e.g., a spring) exerts less closing force on the plunger 62 than the closing force exerted by the gas flow. In one embodiment, a spring 64 is in an unloaded state when plunger is in the fully closed position, such that the spring imparts little or no force (i.e., zero closing spring force) thereon. As plunger 62 moves from the closed position towards the open position (i.e., away from orifice 59), bias 64 begins to exert an increasing closing force (i.e., spring begins to load) on plunger 62 to bias the plunger back towards the closed position. As plunger 62 moves from the closed position and away from orifice 59 (and valve seat 63) towards the open position, the closing pressure applied to the plunger by the inlet gas flow decreases, as a portion of the pressurized gas flows through orifice 59.

Referring still to FIG. 3, according to one embodiment of the invention, a pressure switch 68 is also included in proportional valve 58. Pressure switch 68 allows for a precise determination to be made of when the inlet gas pressure is at an appropriate level that allows for optimal operation of proportional valve 58. In an exemplary embodiment, pressure switch 68 is a compact switch having a reduced size and weight, and includes a printed circuit board (PCB) 69 and a tactile dome switch 70. The PCB 69 is reduced in size and can have, for example, dimensions of 2 cm length, 2 cm width, and 1.25 cm height, with the tactile dome switch 70 mounted thereon, thus providing a miniaturized pressure switch 68 having minimal space requirements. It is also envisioned that PCB 69 could be circular in shape with a diameter of 3 cm. The dome switch 70 in pressure switch 68 is designed to actuate at a specific inlet gas pressure and create an electrical connection on the PCB 69. A signal is then transmitted from pressure switch 68 via an electrical connection (not shown) to, for example, cause illumination of a light emitting diode (LED) display, to indicate to an operator that sufficient pressure is available to proportional valve 58 to allow for operation thereof and performance of a desired cutting operation. According to one embodiment of the invention, pressure switch is configured to generate an alert (i.e., audible/visual alert) if the dome switch 70 is not actuated within a predetermined period of time from start-up of the plasma torch.

Figure 4:
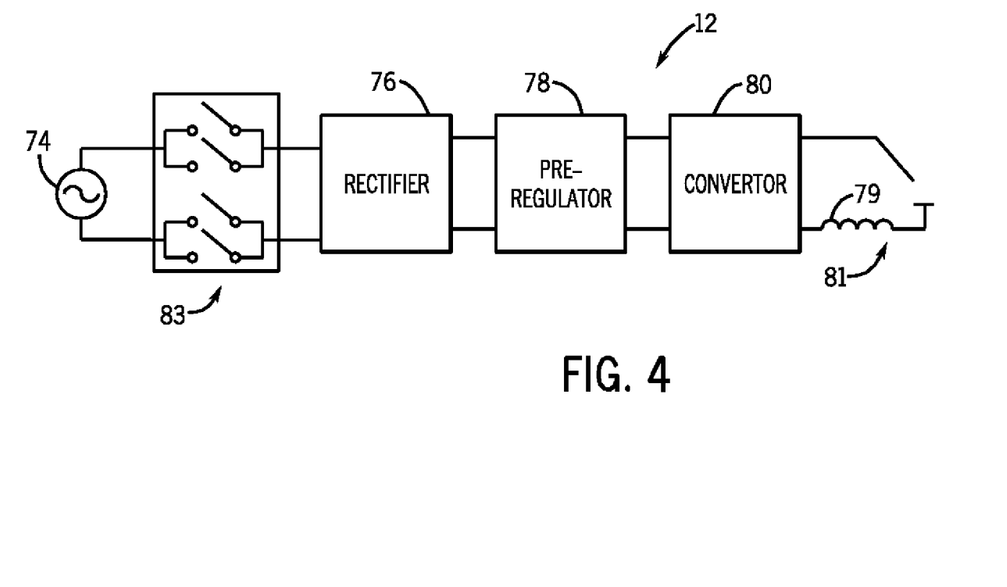
FIG. 4 is a block diagram of a power supply for use in the plasma cutting system of FIG. 1, according to an embodiment of the invention.

Referring now to FIG. 4, in accordance with one embodiment of the invention, a block diagram of welding power supply 12 constructed as an inverter-based power supply is shown. A source 74 represents the input line voltage used to provide power to the power supply 12. The input line voltage may be anywhere between 90 and 250 volts in the preferred embodiment. The voltage typically operates at a frequency of 60 hertz (in the United States) and is single phase in the preferred embodiment (although alternative embodiments use a three phase input), although it is recognized that other voltages may also be used. According to one embodiment of the invention, the input voltage is provided to a four-pole switch 83. The four-pole switch 83 has a pair of two-pole outputs (i.e., two poles electrically connected or "tied together") to form a two-pole switch having increased power and voltage output. As the four-pole switch 83 has a pair of tied together two-pole outputs, the switch is also compact in size, allowing for a reduction in overall size/weight of power source 12.

The input line voltage is provided to four-pole switch 83, which can be switched between open and closed states to control generation of a plasma cutting power by power source 12. When the four-pole switch 83 is in a closed state, the input line voltage is transmitted to a rectifier 76, which may be a simple bridge rectifier. The output of rectifier 76 is a rectified sinusoid. A pre-regulator 78 receives the rectified sinusoid from rectifier 76 and provides a DC bus output to an output inverter 80. Pre-regulator 78, in the preferred embodiment is a soft-switch boost convertor which provides a controlled power factor below unity, as will be described in detail below. Pre-regulator 78 also allows the input voltage to be anywhere within a range of input voltages in the preferred embodiment. Output convertor 80 is preferably a half-bridge, transformer isolated, soft (or slow) switched inverter. Such an output circuit will be described in detail below. Output convertor 80 may alternatively be a typical forward convertor (generally a buck convertor and a transformer), and other output converters may be used in other embodiments. The output of convertor 80 is provided through inductor 79 to power output 81.

Figure 5:
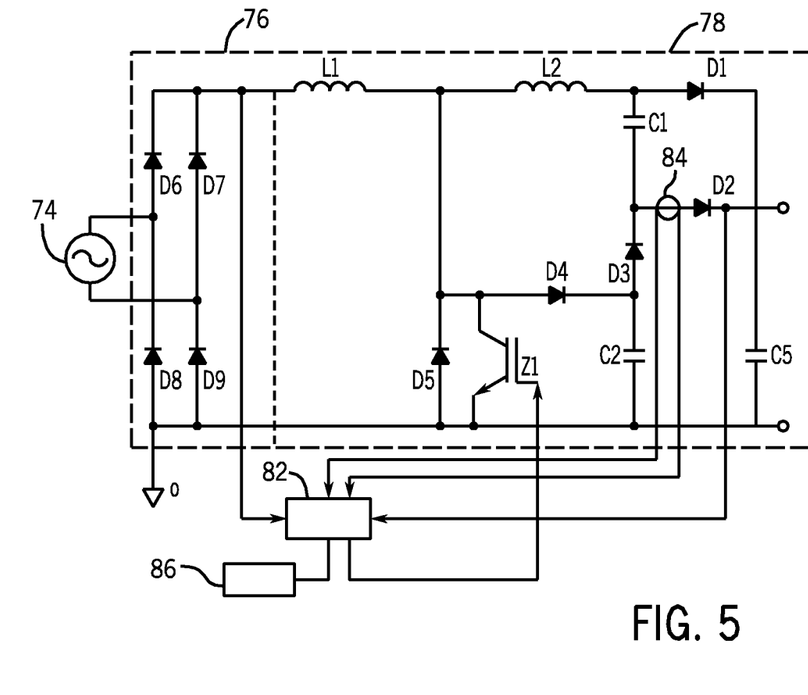
FIG. 5 is a circuit diagram of a portion of the power supply shown in FIG. 4, according to an embodiment of the invention.

Referring now to FIG. 5, the rectifier 76 and pre-regulator 78 are shown in detail. Rectifier 76 is comprised of diodes D6, D7, D8, and D9, which rectify the input voltage to provide a single polarity sinusoidal input voltage. The rectified sinusoidal input voltage is applied to pre-regulator 78 and is received by a boost inductor L1, which is connected with a boost switch Z1 (preferably an IGBT) to form a boost convertor. An anti-parallel diode D5 is connected across switch Z1 to protect switch Z1 during transitions. A lossless switching is provided by a snubber inductor L2, a pair of capacitors C1 and C2, and diodes D1, D2, D3, and D4. Switch Z1 is switched in a known manner such that the output of pre-regulator 78 is a desired voltage, no matter what the input voltage is. The output is provided across a capacitor C5 that provides a stable voltage source for the downstream convertor 80. Also, capacitor C5 prevents the voltage from being too high and damaging switch Z1.

According to an exemplary embodiment of the invention, a power factor correction circuit 82 (such as one shown and described in U.S. Pat. No. 7,336,512 to Geissler) is included in pre-regulator 78 to provide a controlled power factor correction (PFC). The PFC circuit 82 receives as inputs the output voltage from rectifier 76, the output voltage from pre-regulator 78, and the line current of pre-regulator 78 (using a current transformer 84). Because the frequency of pre-regulator 78 (25 KHz) is much higher than that of the line (60 Hz), the pre-regulator current can be made to track the input line voltage shape by sensing the shape of the input voltage, and controlling the input current in response thereto. Thus, the PFC circuit 82 generally senses the input voltage waveform, and conforms the shape of the current waveform to that of the line voltage waveform.

A waveform controller 86 is included in PFC circuit 82 to control the amount of correction of the power factor achieved thereby. That is, waveform controller 86 is configured/programmed to distort the shape (i.e., amplitude, phase, and/or shape) of the current waveform to vary slightly from that of the line voltage waveform. According to embodiments of the invention, the waveform controller 86 can operate to produce a sinusoidal, trapezoidal, or triangular current waveform (amongst others) that are varied/distorted from the line voltage waveform, which can also take different shapes/forms. Such a distortion of the current waveform urges the power factor away from unity (i.e., reduces the factor from 1) to a value of, for example, approximately 0.95 (+/−0.01 to 0.02) in an exemplary embodiment. It is recognized that the shape of the current waveform, and the amount of distortion therein, can be controlled to vary the power factor as desired by an operator. Beneficially, the controlled lowering of the power factor away from unity reduces the amount of bus voltage ripple (i.e., amplitude of the voltage ripple) in power supply 12, which allows for more stable power output from the power supply. Reduction of the voltage ripple amplitude also allows for the use of smaller capacitor values in power supply 12, which beneficially reduces space requirements in the power supply. While allowing for the lowering of the power factor away from unity, it is also recognized that the power factor of 0.95 is still adequate for reducing power transmission losses and associated power consumption costs, and improving voltage regulation at the load.

Figure 6:
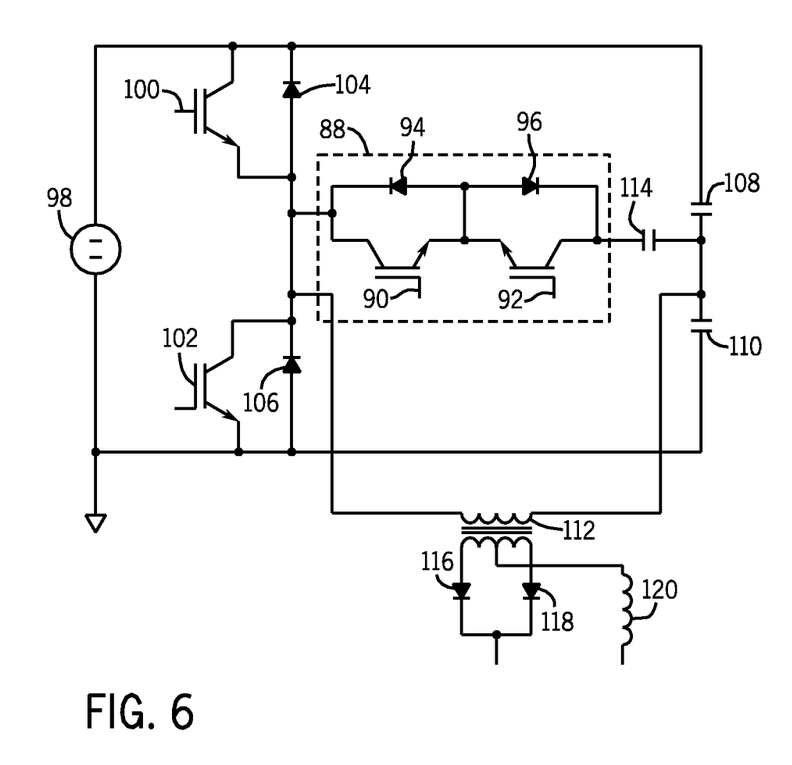
FIG. 6 is a circuit diagram of another portion of the power supply shown in FIG. 4, according to an embodiment of the invention.

Referring now to FIG. 6, convertor 80 included in power source 12 is shown according to one embodiment of the invention. Convertor 80 is configured as a half-bridge, transformer isolated, inverter that is slow voltage transition (SVT) switched. The inverter 80 uses a switch circuit 88 that includes a pair of switches or IGBT's 90, 92, and a pair of diodes 94, 96. Diode 94 is an anti-parallel diode for switch 90. Diode 96 is an anti-parallel diode for switch 92. The two switch/diode parallel combinations are in series, but reversed, i.e. in opposing directions. This configuration provides a diode-type switch whose direction can be reversed. Inverter 80 also includes a DC voltage source 98 (from pre-regulator 78 and PFC circuit 82), a pair of switches 100, 102, with a pair of anti-parallel diodes 104, 106, a pair of capacitors 108, 110, a transformer 112, a capacitor 114, an output rectifier including diodes 116, 118, and an output inductor 120.

Capacitor 114 is switched across transformer 112 by switches 100, 102. Switches 90, 92 are used to soft switch switches 100, 102. Switches 90, 92 do not need any special timing, and run at effectively 50% duty cycle. For example, switches 100, 90 turn on together, and switch 100 delivers current to transformer 112, while switch 90 does nothing. When switch 100 turns off, switch 90 remains on, and current is directed through switch 90 and diode 96 into capacitor 114, thus giving a SVT turn off. Switch 90 is turned off after the transition and diode 96 prevents the back flow of current from capacitor 114. This occurs in complimentary fashion with switches 100, 90 and diode 96. Thus, the circuit of inverter 80 provides full-wave transformer usage, PWM control, complete capacitor balance control with no extra circuitry, and efficient use of switches with SVT. While shown and described in FIG. 6 as a half-bridge inverter, it is also recognized that alternative embodiments could include a full bridge inverter.

Beneficially, the inclusion of some or all of the mechanisms set forth above results in plasma cutting system 10 having an increased power density. That is, inclusion of proportional valve 58 (and pressure switch 70) and the construction/configuration of power supply 12 as an inverter-based power supply, allows for the size of the power supply housing 11 to be reduced and the weight of plasma cutting system 10 (i.e., power supply 12 and related gas flow control components, such as proportional valve 58/pressure switch 68) to be reduced while maintaining a high power output. The inclusion of inverter based power supply 12 (including power switch 83), proportional valve 58, and pressure switch 70 allows for power supply housing 11 to be downsized, as the proportional valve 58 is smaller in size as compared to separate valve and mechanical regulator devices. Additionally, the inclusion of inverter 80 and main power switch 83 allow for a maintaining of a high output power (i.e., 6-8 kW or more) even with the overall reduction in size of the power supply housing 11. Thus, plasma cutting system 10 is constructed to have a sustained power density in the form of a power-to-weight ratio, of at least approximately 550 Watts per kilogram (W/kg), or 250 watts per pound (W/lb), with a power density of 730 W/kg being preferred. In terms of a power-to-volume ratio, plasma cutting system 10 is constructed to have a sustained power density of at least 365 Watts per Liter (W/L), or 6.0 Watts per cubic inch (W/in$^3$), with a power density of 520 W/L being preferred. It is also recognized that higher power densities can be achieved for short durations or bursts during operation of the plasma cutting system 10.

It should be noted that the valve identified as a "proportional valve" in the above description, is not limited to a valve whose flow rate or pressure is directly proportional to voltage or current applied to its control. Rather, it is meant to imply a valve whose output changes incrementally with applied voltage or current and is not an "on-off" type valve. The applied voltage or current can be used to determine the valve limits, as can an auxiliary position indicator in communication with the moving part of the solenoid in the valve. There may also be other additional ways to determine valve position or the limits of its operation.

Therefore, according to one embodiment of the invention, a plasma cutting system includes a housing and a power source disposed within the housing constructed to generate plasma cutting power. The plasma cutting system also includes a plasma torch actuated by a trigger and connected to the power source to produce a cutting arc and has a power-to-weight ratio of at least 550 Watts per kilogram (W/kg).

According to another embodiment of the invention, a plasma cutting system includes a housing and a power source disposed within the housing constructed to generate plasma cutting power, the power source comprising a four-pole power switch including a pair of two-pole connections to form a compact high power two-pole switch. The plasma cutting system also includes a plasma torch actuated by a trigger and connected to the power source, a gas flow system constructed to receive pressurized gas and provide a gas flow to the plasma torch, and a single-coil proportional valve connected to the gas flow system and having a control to regulate gas flow to the plasma torch.

According to yet another embodiment of the invention, a plasma cutting system includes a housing and a power source disposed within the housing constructed to generate plasma cutting power, with the power source comprising a power factor correction circuit configured to maintain a power factor of the power source below unity and reduce bus voltage ripple in the power source. The plasma cutting system also includes a plasma torch actuated by a trigger and connected to the power source and a gas flow system constructed to receive pressurized gas and provide a gas flow to the plasma torch.

As one skilled in the art will fully appreciate, the heretofore description of a plasma cutting system is one example of a plasma cutting system according to the present invention. The description of the present invention is merely exemplary in nature and, thus, variations that do not depart from the substance of the invention are intended to be within the scope of the invention. Such variations are not to be regarded as a departure from the spirit and scope of the appending claims.

What is claimed is:

1. A plasma cutting system comprising:
   a housing;
   a power source disposed within the housing constructed to generate plasma cutting power; and
   a plasma torch actuated by a trigger and connected to the power source to produce a cutting arc;
   the plasma cutting system having a power-to-weight ratio of at least 550 Watts per kilogram (W/kg), wherein the power-to-weight ratio is a ratio of the generated plasma cutting power to a weight of the power source and other components disposed within the housing.

2. The plasma cutting system of claim 1 configured to have a power-to-volume ratio of at least 365 Watts per cubic inch (W/L), wherein the power-to-volume ratio is a ratio of the generated plasma cutting power to an interior volume of the housing.

3. The plasma cutting system of claim 1 wherein the power source comprises a power factor correction circuit configured to maintain a power factor of the power source below unity and reduce a bus voltage ripple in the power source.

4. The plasma cutting system of claim 3 wherein the power factor correction circuit comprises a waveform controller configured to vary a current waveform from an input voltage waveform.

5. The plasma cutting system of claim 4 wherein the waveform controller is configured to control the varied current waveform to maintain the power factor at a level of approximately 0.95.

6. The plasma cutting system of claim 1 wherein the power source comprises a main power switch to control generation of the plasma cutting power, the main power switch including a four-pole switch having a pair of two-pole outputs formed by electrically connecting two of the four-poles.

7. The plasma cutting system of claim 1 wherein the power source comprises:
   a rectifier configured to convert an incoming AC power to a DC power;
   a pre-regulator configured to condition the DC power; and
   an inverter configured to invert the DC power into a conditioned AC plasma cutting power.

8. The plasma cutting system of claim 7 wherein the inverter includes a half-bridge rectifier.

9. The plasma cutting system of claim 1 further comprising a high-speed cooling fan attached to the housing to cool the power source, the high-speed cooling fan capable of operating at approximately 8000 RPM or greater.

10. The plasma cutting system of claim 1 further comprising:
    a gas flow system constructed to receive pressurized gas and provide a gas flow to the plasma torch; and
    a single-coil proportional valve having a control to regulate the gas flow to the plasma torch.

11. The plasma cutting system of claim 10 wherein the proportional valve further comprises a pressure switch configured to actuate at a pre-determined inlet gas pressure, the pressure switch mounted to a printed circuit board (PCB) and having a tactile dome switch mounted thereto.

12. A plasma cutting system comprising:
    a housing;
    a power source disposed within the housing constructed to generate plasma cutting power, the power source comprising a four-pole power switch including a pair of two-pole connections to form a compact high power two-pole switch;
    a plasma torch actuated by a trigger and connected to the power source;
    a gas flow system constructed to receive pressurized gas and provide a gas flow to the plasma torch; and
    a single-coil proportional valve connected to the gas flow system and having a control to regulate gas flow to the plasma torch.

13. The plasma cutting system of claim 12 wherein the power source comprises a power factor correction circuit configured to maintain a power factor of the power source below unity to reduce a bus voltage ripple in the power source.

14. The plasma cutting system of claim 13 wherein the power factor correction circuit comprises a waveform controller configured to distort a current waveform to vary from an input voltage waveform and maintain the power factor at a level of approximately 0.95.

15. The plasma cutting system of claim 12 wherein the power source comprises:
    a rectifier connected to the four-pole power switch to receive an incoming AC power therefrom and convert the incoming AC power to a DC power;
    a pre-regulator connected to the rectifier to condition the DC power; and
    an inverter connected to the pre-regulator to receive the DC power and to convert the DC power into a conditioned AC power as the plasma cutting power.

16. The plasma cutting system of claim 12 wherein the proportional valve is a pressure closing valve and further comprises a pressure switch configured to actuate at a pre-determined inlet gas pressure, the pressure switch packaged with a tactile dome switch and integrated into including a printed circuit board (PCB) and a tactile dome switch mounted to the PCB.

17. The plasma cutting system of claim 12 configured to have a power density of at least 365 Watts per liter (W/L) as a ratio of the generated plasma cutting power to an interior volume of the housing and at least 550 Watts per pound (W/kg) as a ratio of the generated plasma cutting power to a weight of the power source and other components disposed within the housing.

18. A plasma cutting system comprising:
    a housing;
    a power source disposed within the housing constructed to generate plasma cutting power, the power source comprising a power factor correction circuit configured to maintain a power factor of the power source below unity and reduce bus voltage ripple in the power source;
    a plasma torch actuated by a trigger and connected to the power source; and
    a gas flow system constructed to receive pressurized gas and provide a gas flow to the plasma torch.

19. The plasma cutting system of claim 18 wherein the power factor correction circuit comprises a waveform controller to distort a current waveform as compared to an input voltage waveform.

20. The plasma cutting system of claim 19 wherein the waveform controller is configured to control the current waveform distortion and maintain the power factor at a level of approximately 0.95.

21. The plasma cutting system of claim 18 wherein the power source comprises:
- a main power switch positioned to receive an incoming AC power and control generation of the plasma cutting power, the main power switch comprised of a four-pole switch having a pair of two-pole outputs formed by electrically connecting two of the four-poles to form a compact high power two-pole switch;
- a rectifier connected to the main power switch to convert the incoming AC power to a DC power;
- a pre-regulator connected to the rectifier; and
- an inverter connected to the pre-regulator to produce conditioned AC power.

22. The plasma cutting system of claim 18 configured to have a power density of at least 365 Watts per liter (W/L) as a ratio of the generated plasma cutting power to an interior volume of the housing and at least 550 Watts per pound (W/kg) as a ratio of the generated plasma cutting power to a weight of the power source and other components disposed within the housing.

23. The plasma cutting system of claim 18 further comprising a pressure closing proportional valve connected to the gas flow system and having a control to regulate the gas flow to the plasma torch.

24. The plasma cutting system of claim 23 wherein the pressure closing proportional valve further comprises a pressure switch configured to actuate at a pre-determined inlet gas pressure and close the valve in response thereto, the pressure switch having a tactile dome switch and mounted to a printed circuit board (PCB).

* * * * *